United States Patent} [19] [11] 4,255,067
Wright [45] Mar. 10, 1981

[54] DISPOSAL OF LIQUID WASTE AND RECOVERY OF METALS THEREFROM

[75] Inventor: John C. Wright, 1030 Santa Monica, Springfield, Ohio 45503

[73] Assignee: John C. Wright, Springfield, Ohio

[21] Appl. No.: 957,401

[22] Filed: Nov. 2, 1978

[51] Int. Cl.³ .......................... C02F 1/00; C02F 11/12
[52] U.S. Cl. ...................................... 405/129; 159/32; 210/170; 210/751; 405/128; 405/258
[58] Field of Search ............... 405/128, 129, 258, 270; 165/45; 210/59, 170; 159/47 WL, 32, 2 R; 299/7-9

[56] References Cited

U.S. PATENT DOCUMENTS

| | | | |
|---|---|---|---|
| 3,446,026 | 5/1969 | Fikse | 405/129 |
| 3,490,513 | 1/1970 | Villanueva | 159/32 X |
| 3,511,056 | 5/1970 | Jones et al. | 405/129 |
| 3,586,624 | 6/1971 | Larson | 210/3 |
| 3,614,867 | 10/1971 | Nieman | 405/129 |
| 3,705,851 | 12/1972 | Brauer | 405/129 X |
| 3,732,697 | 5/1973 | Dickson | 405/129 |
| 3,759,044 | 9/1973 | Caron et al. | 405/129 |
| 3,814,685 | 6/1974 | Rachor et al. | 210/59 |
| 3,817,859 | 6/1974 | Tate | 210/57 |
| 3,841,102 | 10/1974 | Cinner et al. | 405/129 |
| 3,842,764 | 10/1974 | Bauer | 111/7 |
| 3,953,306 | 4/1976 | Lancy | 210/59 X |
| 3,978,673 | 9/1976 | Schleede | 405/129 |
| 3,980,558 | 9/1976 | Thompson | 405/129 X |
| 4,016,073 | 4/1977 | Jordan | 210/24 |
| 4,035,543 | 7/1977 | Draper et al. | 405/270 X |
| 4,087,276 | 5/1978 | Generini | 210/59 X |
| 4,169,791 | 10/1979 | Johnson et al. | 210/170 X |
| 4,176,057 | 11/1979 | Wheatley et al. | 210/170 X |

Primary Examiner—Dennis L. Taylor
Attorney, Agent, or Firm—Biebel, French & Nauman

[57] ABSTRACT

Industrial liquid wastes containing low concentrations of heavy metals are applied to a soil bed where evaporation of the liquid occurs. The soil bed is lined with a liquid-impermeable liner of polymeric sheet material, bentonite clay or a laminate of the two to prevent escape of the liquid waste to the surrounding environment. After repeated applications of wastes to the bed, the concentration of metals in the bed reaches a level where the metals may be recovered by standard mining operations.

10 Claims, No Drawings

DISPOSAL OF LIQUID WASTE AND RECOVERY OF METALS THEREFROM

BACKGROUND OF THE INVENTION

Many effluent streams from industries are waste with no apparent beneficial use. However, environmental antipollution laws prohibit direct discharge of such streams to the environment because of the environmentally harmful materials they contain. Therefore, provision must be made for the safe disposal of such streams while confining or neutralizing their harmful effects.

Many different methods of disposal of liquid wastes have been devised. For example, both Cinner, U.S. Pat. No. 3,841,102, and Thompson, U.S. Pat. No. 3,980,558, treat liquid wastes with alkali metal silicates and/or cementitious material such as portland cement to solidify and entrap harmful components of the liquid wastes. Both Schleede, U.S. Pat. No. 3,978,673, and Dickson, U.S. Pat. No. 3,732,697, disclose disposal of liquid waste in loose earth, with Dickson further disclosing containment of such waste through use of a water impervious layer of compacted sandy clay soil. Tate, U.S. Pat. No. 3,817,859, disposes of industrial liquid wastes by injection into subterranean formations. Others have used deep wells for the disposal of industrial liquid wastes.

However, none of the above-mentioned technology is concerned with the ultimate recovery of any valuable substituents of such waste streams. For example, many caustic and acidic industrial waste streams such as spent pickling liquors contain low concentrations of various heavy metals such as chromium, aluminum, nickel, and cadmium. These metals would be valuable by-products of any liquid waste disposal system if they could be economically recovered. Accordingly, the need exists for a method of economically recovering valuable metals from liquid industrial waste streams while, at the same time providing for the environmentally safe disposal of such liquid wastes.

SUMMARY OF THE INVENTION

A soil bed is prepared by excavating an area to a depth of from one to ten feet. A liquid-impermeable liner is prepared in the excavation and the soil replaced. The liner may be constructed using a bentonite clay, a sheet of polymeric material, or a combination of the two. Liquid wastes containing low concentrations of metals are adjusted to a pH of 4-8 and then added to or injected into the soil bed to a depth of approximately 10-14 inches. The soil is turned frequently (2-3 times/day) to increase the rate of evaporation of the liquid. After repeated applications of such liquid waste materials, the concentration level of metals in the soil will have built up to such an extent that such metals may be recovered by conventional mining operations.

Optionally, the liner of the soil bed may be so designed that excess liquid in the bed reaching the liner is drained away, collected, and then reapplied to the top of the soil bed. Additionally, the bed may be covered by a roof or other structure to prevent rain or other forms of precipitation from slowing the evaporation process.

It is accordingly an object of this invention to provide a method of recovering metals from industrial waste streams.

It is a further object of this invention to provide a method of liquid waste disposal for industrial waste streams containing low concentrations of metals.

Other objects and advantages of the invention will be apparent from the following description and the appended claims.

DESCRIPTION OF THE PREFERRED EMBODIMENTS

The soild bed of the present invention is prepared by excavating an area from about one to about ten feet in depth. A loam-type soil is ideal for use in the bed because it is well adapted to trap and retain any metals present in the liquid waste although almost any type of soil will be suitable for this purpose. Depending upon the quantities of liquid waste available to be treated, the area of the excavation may be varied. However, for large-scale operations, areas of several acres may be excavated to provide for a disposal site. The excavation is then lined with a liquid-impermeable material to prevent leaching or seepage of environmentally harmful materials from the bed. As a lining material, bentonite clay or a sheet of polymeric material or a laminate of the two may be utilized. The preferred construction of the liner is a layer of bentonite clay sandwiched between sheets of 10-20 mil thickness Hypalon, a polymeric sheet material of chlorosulfonated polyethylene manufactured by E. I. duPont deNemours & Co. Use and construction of such laminates formed by bentonite clay and a sheet of polymeric material as water-impermeable layers in soil is shown by Caron et al, U.S. Pat. No. 3,759,044. After the excavated soil is replaced over the liner, the soil bed is ready to receive liquid wastes.

Optionally, the excavation and liner may be designed to collect any liquids passing all of the way through the soil bed for recirculation. This may be done by equipping the liner with a drain and sloping the excavation toward such drain. There any liquids are collected and pumped back to the surface where they are reinjected into the bed.

The method of the present invention is operable using either acidic or basic liquid wastes.

Preferably, both acidic and basic liquid wastes will be available so that they may be blended together prior to application to the soil bed. In this manner, the pH of the resulting solution is somewhat neutralized to protect any equipment used in the practice of this invention from corrosive attack. At any rate, the pH of any liquid wastes is preferably adjusted to between 4 and 8 prior to application to the soil bed. As discussed above, this may be accomplished by blending acidic and basic liquid waste streams together in the correct proportions. Alternatively, the pH of the waste may be adjusted by the addition of appropriate make-up chemicals to achieve the proper pH range.

The pH adjusted liquid waste is then applied to the soil bed by any suitable means. For example, a pipe and hose applicator assembly such as that disclosed by Schleede, U.S. Pat. No. 3,978,673, may be used. Alternatively, the liquid waste may be injected into the soil to a depth of 10 to 14 inches. The rate of application of liquid waste is dependent upon the rate of evaporation from the soil bed and will vary according to weather conditions. Desirably, the soil in the bed is turned 2 to 3 times a day by a discing operation to enhance the rate of evaporation. Where possible, the soil bed may be protected from rain or other forms of precipitation by a roofed structure.

Liquid wastes containing concentrations of heavy metals are applied successively to the soil bed to build up concentrations of metals in the bed. Wastes containing various metals may be mixed and applied to the bed or liquid wastes containing a single metal may be applied successively to a portion of the bed. By segregating portions of the bed for application of wastes containing only a single metal, the need for a separate step of segregating those metals after mining is eliminated. After successive applications, concentrations of metals in the bed will reach a level where it becomes economical to mine the bed by conventional mining operations to recover such metals.

While aqueous wastes are of primary interest, the method of this invention is also useful for the disposal of liquid wastes which contain certain organic chemical compounds such as phenolic compounds. However, such organic compounds should not be easily vaporizable since volatile organic chemicals would evaporate into the surrounding atmosphere.

While the methods herein described constitute preferred embodiments of the invention, it is to be understood that the invention is not limited to these precise methods, and that changes may be made in either without departing from the scope of the invention, which is defined in the appended claims.

What is claimed is:

1. A method of recovering heavy metals from industrial liquid wastes containing such metals comprising the steps of:
    preparing a soil bed to receive industrial liquid wastes containing heavy metals, the soil bed having a liquid-impermeable lining,
    applying said wastes to said soil bed,
    evaporating the water contained in the soil bed, and
    mining the soil bed to recover the heavy metals contained therein.

2. The method of claim 1 where the soil bed has a depth of from one to ten feet.

3. The method of claim 2 where said liquid-impermeable lining is bentonite clay.

4. The method of claim 2 further comprising the step of turning the soil in the soil bed frequently to enhance evaporation of the liquid waste.

5. The method of claim 4 wherein the steps of applying the liquid wastes and evaporating water contained therein is repeated prior to mining the soil bed.

6. The method of claim 5 wherein liquid wastes which collect at said liquid-impermeable liner are collected and conveyed to the surface where they are reapplied to said soil bed.

7. The method of claim 1 wherein said liquid wastes are pH adjusted to a pH of 4–8 prior to being applied to said soil bed.

8. The method of claim 7 wherein an acidic liquid waste is combined with a basic liquid waste in order to form a mixture having a pH of 4–8 prior to being applied to said soil bed.

9. The method of claim 2 where said liquid impermeable lining is a sheet of polymeric material.

10. The method of claim 2 where said liquid impermeable lining is a laminate of bentonite clay and a sheet of polymeric material.

* * * * *